United States Patent [19]

Sayama

[11] Patent Number: 4,940,123
[45] Date of Patent: Jul. 10, 1990

[54] VISCOUS COUPLING

[75] Inventor: Masayuki Sayama, Tochigi, Japan

[73] Assignee: Viscodrive Japan Ltd., Japan

[21] Appl. No.: 335,425

[22] Filed: Apr. 10, 1989

[30] Foreign Application Priority Data

Apr. 11, 1988 [JP] Japan .............................. 63-47758[U]

[51] Int. Cl.⁵ .............................................. F16D 31/02
[52] U.S. Cl. ................................ 192/58 B; 192/103 F
[58] Field of Search .................. 192/58 B, 48.91, 48.8, 192/103 F; 60/485; 74/650

[56] References Cited

U.S. PATENT DOCUMENTS

| | | | |
|---|---|---|---|
| 3,630,331 | 12/1971 | Bradbury | 192/82 T |
| 3,648,811 | 3/1972 | LaFlame | 192/82 T |
| 4,064,980 | 12/1977 | Tinholt | 192/58 B |
| 4,727,966 | 3/1988 | Hiramatsu et al. | 192/85 AA |

FOREIGN PATENT DOCUMENTS

| | | | |
|---|---|---|---|
| 3725103 | 7/1987 | Fed. Rep. of Germany . | |
| 2199121 | 6/1988 | United Kingdom | 192/58 B |

Primary Examiner—Rodney H. Bonck
Assistant Examiner—Andrea Pitts
Attorney, Agent, or Firm—Samuels, Gauthier & Stevens

[57] ABSTRACT

A viscous coupling capable of preventing decrease in torque obtained by the shear force. The viscous coupling includes relatively rotatable first, second, and third rotating members forming an operation chamber in which a viscous fluid is to be confined; a dividing member placed inside the operation chamber for dividing the operation chamber into a first chamber formed by the dividing member and the first and third rotating members, and a second chamber formed by the dividing member and the second and third rotating members; and a pump for controlling flow of the viscous fluid between the first and second chambers.

5 Claims, 3 Drawing Sheets

VISCOUS COUPLING

BACKGROUND OF THE INVENTION

1. Field of the Invention

The present invention relates to a viscous coupling utilizing viscous fluid, useful for a power transmission system of a vehicle.

2. Description of the Background Art

One conventional viscous coupling is shown in FIG. 1, which can be found in 'Automobile Engineering' Jun., 1987 Edition, published by Tetsudo-Nippon Co.

This viscous coupling of FIG. 1 is one to be used in a four wheel drive vehicle of front engine front drive type (FF type), instead of a rear wheel differential device. Thus, there is a driving pinion gear 101 to which torque from an engine is transmitted through a propeller shaft. This driving pinion gear 101 is engaged with a ring gear 102 attached on a diff case 103. Inside the diff case 103, there is a first and a second hubs 104 and 105 which are relatively coaxially rotatable, and which are connected to left and right rear wheel driving shafts 106a and 106b, respectively. The diff case 103 and the first and second hubs 104 and 105 form an operation chamber 107 in which viscous fluid is to be confined. Inside this operation chamber 107 there are plurality of first left and right resistive plates 108a and 108b which are spline connected to the diff case 103 over the first and second hubs 104 and 105, respectively. In addition, there are plurality of second left and right resistive plates 109a and 109b which are spline connected to the first and second hubs 104 and 105, respectively, such that each of the second resistive plate is between two of the adjacent first resistive plates. The operation chamber 107 is divided into first and second chambers 111 and 112 over the first and second hubs 104 and 105, respectively, by a divider 110 in a middle which has a hole 113 connecting the first and second chambers 111 and 112.

Now, when a vehicle is running on a high friction road, the torque from the engine is transmitted to a front wheel driving shaft. In this case, there is no difference in numbers of rotations between the front wheels and rear wheels so that the viscous coupling between the propeller shaft and the rear wheel driving shafts 106a and 106b does not operates and the vehicle runs in front wheel drive mode.

On the other hand, in a situation where the front wheels skid on a low friction road, there appears a large difference between numbers of rotations of the front and rear wheels. In such a situation, the diff case 103 connected to the front wheel driving shaft rotates faster than the left and right rear wheel driving shafts 106a and 106b, so that there is a relative rotation between the first left and right resistive plates 108a and 108b connected to the diff case 103 and the second left and right resistive plates 109a and 109b connected to the left and right rear wheel driving shafts 106a and 106b, which in turn shear through the viscous fluid inside the operation chamber 107. Resulting torque due to shear force of the viscous fluid is transmitted to the left and right rear wheel driving shafts 106a and 106b as an escaping power from skidding of the vehicle.

Similarly, when the left rear wheel skids, there appears a difference in the numbers of rotations between the diff case 103 and the second hub 105 connected to the right rear wheel driving shaft 106b, and consequently there is a relative rotation between the first resistive plates 108b connected to the diff case 103 and the second resistive plates 109b connected to the right rear wheel driving shaft 106b, which in turn shear through the viscous fluid inside the second operation chamber 112. Resulting torque due to shear force of the viscous fluid is transmitted to the right rear wheel driving shaft 106b as an escaping power from skidding of the left rear wheel of the vehicle.

Here, however, in a conventional viscous coupling of FIG. 1, the first right resistive plate 108b and the second right resistive plate 109b in the second chamber 112 relatively rotate, i.e., with respect to each other, whereas the first left resistive plate 108a and the second left resistive plate 109a in the first chamber 109b do not relatively rotate very much. Thus, the relative rotation of the first right resistive plate 108b and the second right resistive plate 109b in the second chamber 112 causes thermal expansion of the viscous fluid in the second chamber 112 which subsequently flows into the first chamber 111 through the hole 113. This in turn makes the viscous fluid in the second chamber 112 less viscous and less condensed so that the torque due to the shear force resulting from shearing of the first right resistive plate 108b and the second right resistive plate 109b through the viscous fluid decreases and no hump phenomena occurs. The hump phenomena is a rapid increase of the transmitted torque occurring above certain inner pressure at which the resistive plates are bound together, as the inner pressure increases by heat generated by the fluid friction of the viscous fluid against the resistive plates, after some consecutive relative motion of the resistive plates.

Consequently, with a conventional viscous coupling of FIG. 1 it is not possible to escape from skidding of one of the rear wheels smoothly, so that the running stability of the vehicle is limited.

SUMMARY OF THE INVENTION

It is therefore an object of the present invention to provide a viscous coupling capable of preventing decrease in torque obtained by the shear force, and thereby enabling escape from skidding of one of the rear wheels smoothly by hump phenomena, so that the running stability of the vehicle can be improved.

This object is achieved by the present invention by providing a viscous coupling, comprising: relatively rotatable first, second, and third rotating members forming an operation chamber in which a viscous fluid is to be confined; divider means placed inside the operation chamber for dividing the operation chamber into a first chamber formed by the dividing means and the first and third rotating members, and a second chamber formed by the dividing means and the second and third rotating members; and pump means for controlling flow of the viscous fluid between the first and second chambers.

Other features and advantages of the present invention will become apparent from the following description taken in conjunction with the accompanying drawings.

DETAILED DESCRIPTION OF THE PREFERRED EMBODIMENTS

Figure 1:
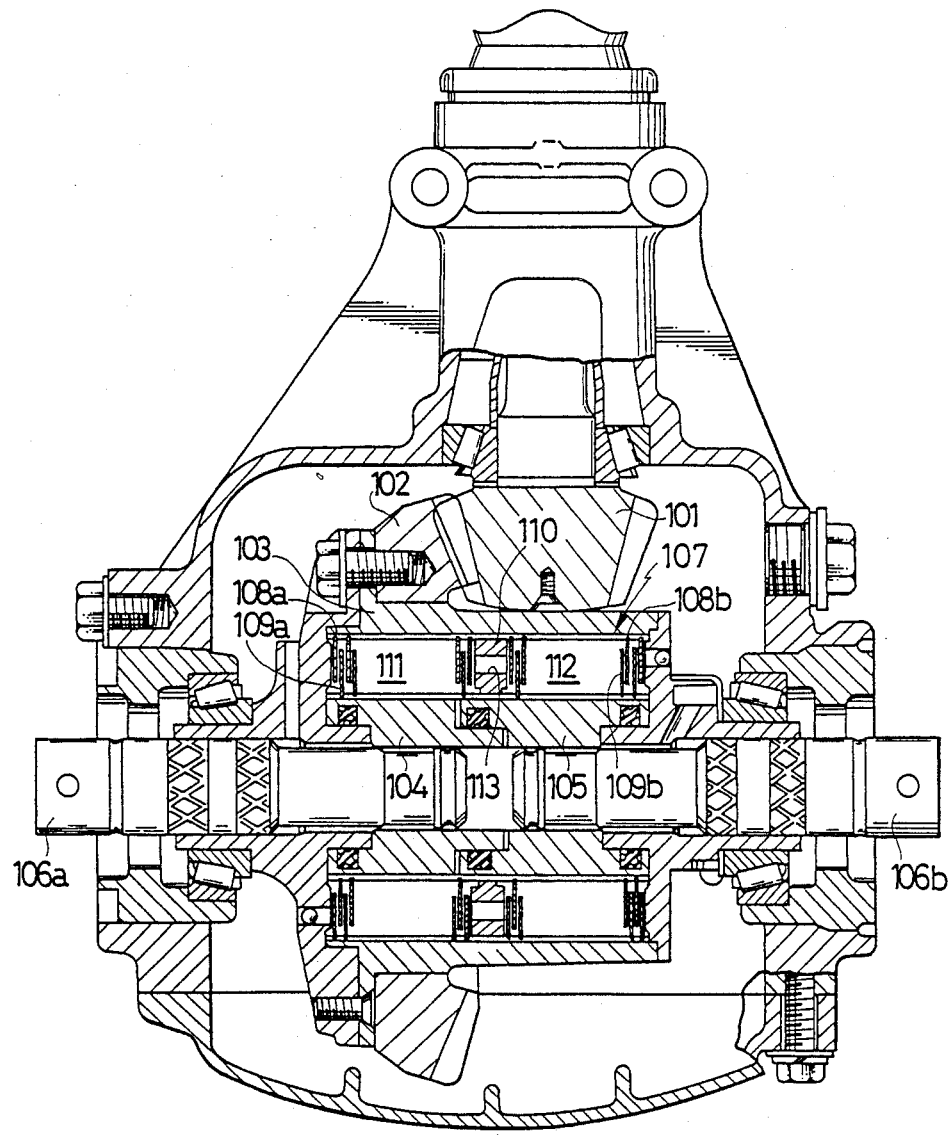
FIG. 1 is a cross sectional view of a conventional viscous coupling for a four wheel drive vehicle of front engine front drive type (FF type).
Figure 2:
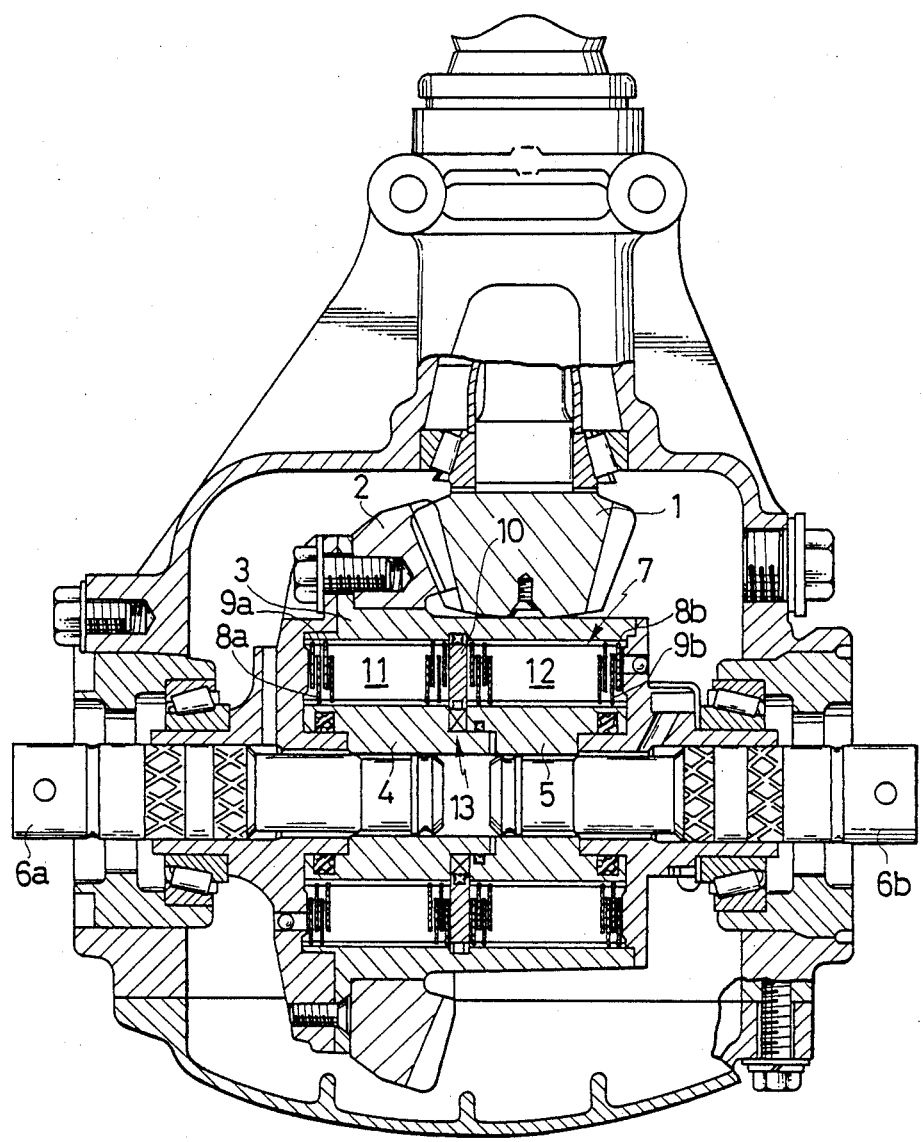
FIG. 2 is a cross sectional view of one embodiment of a viscous coupling for a four wheel drive vehicle of front engine drive type (FF type) according to the present invention.

Referring now to FIG. 2, there is shown one embodiment of a viscous coupling according to the present invention. Here, for the sake of explanation, the viscous coupling is assumed to be placed between a transfer and a propeller shaft in a four wheel drive vehicle of front engine front drive type (FF type).

In this viscous coupling, there is a driving pinion gear 1 to which torque from an engine is transmitted through the propeller shaft. This driving pinion gear 1 is engaged with a ring gear 2 attached on a diff case 3. Inside the diff case 3, there is a first and a second hubs 4 and 5 which are relatively coaxially rotatable, and which are connected to left and right rear wheel driving shafts 6a and 6b, respectively. The diff case 3 and the first and second hubs 4 and 5 form an operation chamber 7 in which silicon oil is to be confined. Inside this operation chamber 7 there are plurality of first left and right resistive plates 8a and 8b which are spline conected to the diff case 3 over the first and second hubs 4 and 5, respectively. In addition, there are plurality of second left and right resistive pates 9a and 9b which are spline connected to the first and second hubs 4 and 5, respectively, such that each of the second resistive plate is between two of the adjacent first resistive plates. The operation chamber 7 is divided into first and second chambers 11 and 12 over the first and second hubs 4 and 5, respectively, by a divider 10 in a middle which has a vane pump 13 which sends the silicon oil from one of the first and second chambers 11 and 12 to the other.

Figure 3:
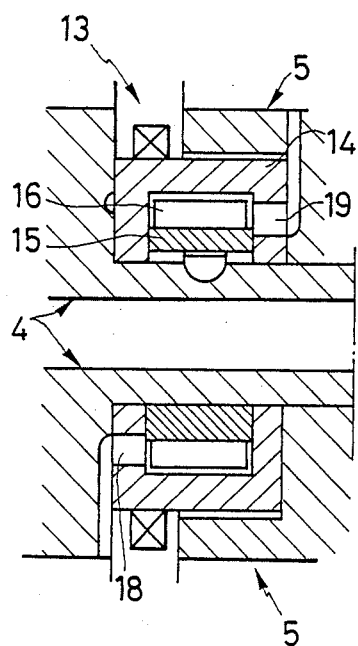
FIG. 3 is a magnified cross sectional view of a vane pump in the viscous coupling of FIG. 2.

The detail of this vane pump 13 is shown in FIG. 3. As shown in FIG. 3, the vane pump 13 comprises an outer housing 14 spline connected to the second hub 5, a rotor 15 key connected to the first hub 4, and a vane 16 depressably attached on the rotor 15. The outer housing 14 has an elliptic inner circumference, the rotor 15 has a circular outer circumference, and the vane 16 keeps contact with the inner circumference of the outer housing 14, as can be seen from FIG. 4(B) and FIG. 5(B). These outer housing 14, rotor 15 and vane 16 form a chamber 17 whose volume changes as the outer housing 14 and the rotor 15 relatively rotates. This change in volume of the chamber 17 produces inhalation and exhalation of the silicon oil through a pair of first and second ports 18 and 19 connected to the first and second chambers 11 and 12, respectively.

Now, when a vehicle is running on a high friction road, the torque from the engine is transmitted to a front wheel driving shaft. In this case, there is no difference in numbers of rotations between the front wheels and rear wheels so that the viscous coupling between the propeller shaft and the left and right rear wheel driving shafts 6a and 6b does not operate and the vehicle runs in front wheel drive mode.

On the other hand, in a situation where the front wheels skid on a low friction road, there appears a large difference between numbers of rotations of the front and rear wheels. In such a situation, the diff case 3 connected to the front wheel driving shaft rotates faster than the left and right rear wheel driving shafts 6a and 6b, so that there is a relative rotation between the first left and right resistive plates 8a and 8b connected to the diff case 3 and the second left and right resistive plates 9a and 9b connected to the left and right rear wheel driving shafts 6a and 6b, which in turn shear through the viscous fluid inside the operation chamber 7. Resulting torque due to shear force of the viscous fluid is transmitted to the left and right rear wheel driving shafts 6a and 6b as an escaping power from skidding of the vehicle.

Figure 4A:
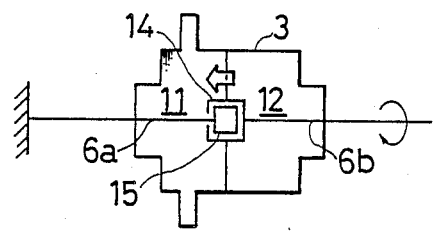
FIG. 4(A) is a schematic diagram of the viscous coupling of FIG. 2 for explaining one situation for the novel operation of the viscous coupling of FIG. 2.
Figure 4B:
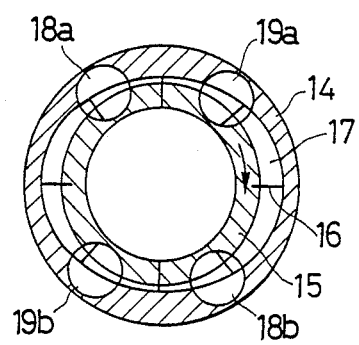
FIG. 4(B) is a horizontal cross sectional view of the vane pump of FIG. 3 for explaining the action of the vane pump in the situation of FIG. 4(A).

Also, as shown in FIG. 4(A), when the right rear wheel skids, the large resistance is felt by the left rear wheel and there appears a difference in the numbers of rotations between the diff case 3 and the first hub 4 connected to the left rear wheel driving shaft 6a. Consequently there is a relative rotation between the first left resistive plates 8a connected to the diff case 3 and the second left resistive plates 9a connected to the left rear wheel driving shaft 6a, which in turn shear through the viscous fluid inside the first chamber 11, whereas the first right resistive plate 8b and the second right resistive plate 9b in the second chamber 12 do not relatively rotate very much, as the right rear wheel which is skidding feel little resistance. Thus the left rear wheel driving shaft 6a rotates with respect to the right rear wheel driving shaft 6b, causing the rotation of the rotor 15 connected to the first hub 4 with respect to the outer housing 14 connected to the second hub 5 in a direction indicated by an arrow in FIG. 4(A). As a result, the first port 18(either 18a or 18b) acts as an exhaling port whereas the second port 19(either 19a or 19b) acts as an inhaling port, so that the silicon oil is inhaled from the second chamber 12 through the inhaling second port 19 and exhaled to the first chamber 11 through the exhaling first port 18. This makes the silicon oil inside the first chamber 11 more condense so that the torque due to the shear force resulting from shearing of the first left resistive plate 8a and the second left resistive plate 9a through the viscous fluid increases. As a consequence, the hump phenomena occurs and the torque transmitted to the left rear wheel driving shaft 6a serves as an escaping power from skidding of the right rear wheel of the vehicle, and the running stability of the vehicle can be improved.

Figure 5A:
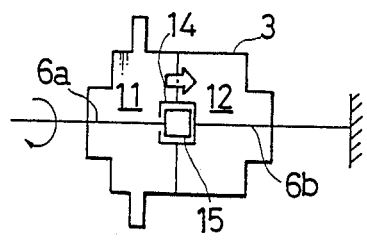
FIG. 5(A) is another schematic diagram of the viscous coupling of FIG. 2 for explaining another situation for the novel operation of the viscous coupling of FIG. 2.
Figure 5B:
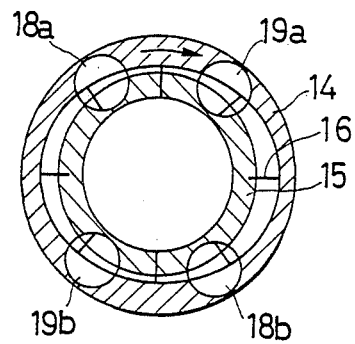
FIG. 5(B) is another horizontal cross sectional view of the vane pump of FIG. 3 for explaining the action of the vane pump in the situation of FIG. 5(A).

Similarly, as shown in FIG. 5(A), when the left rear wheel skids, the large resistance is felt by the right rear wheel and there appears a difference in the numbers of rotations between the diff case 3 and the second hub 5 connected to the right rear wheel driving shaft 6b. Consequently there is a relative rotation between the first right resistive plates 8b connected to the diff case 3 and the second right resistive plates 9b connected to the right rear wheel driving shaft 6b, which in turn shear through the viscous fluid inside the second chamber 12, whereas the first left resistive plate 8a and the second left resistive plate 9a in the first chamber 11 do not relatively rotate very much, as the left rear wheel which is skidding feel little resistance. Thus the left rear wheel driving shaft 6a rotates with respect to the right rear wheel driving shaft 6b, causing the rotation of the outer housing 14 connected to the second hub 5 with respect to the rotor 15 connected to the first hub 4 in a direction indicated by an arrow in FIG. 5(A). As a result, the first port 18(either 18a or 18b) acts as an inhaling port whereas the second port 19(either 19a or 19b) acts as an exhaling port, so that the silicon oil is inhaled from the first chamber 11 through the inhaling first port 18 and exhaled to the second chamber 12 through the exhaling second port 19. This makes the silicon oil inside the second chamber 12 more condense so that the torque due to the shear force resulting from shearing of the first right resistive plate 8b and the second right resistive plate 9a through the viscous fluid increases. As a consequence, the hump phenomena occurs and the torque transmitted to the right rear wheel driving shaft 6b serves as an escaping power from skidding of the left rear wheel of the vehicle, and the running stability of the vehicle can be improved.

Thus, it is possible in this embodiment of a viscous coupling to be capable of preventing decrease in torque due to the shear force, and thereby enabling escape from skidding of one of the rear wheels smoothly by hump phenomena, so that the running stability of the vehicle can be improved.

It is to be noted that the vane pump 13 in the above embodiment may be replaced by a gear pump or other pumps.

Besides this, many modifications and variations of the above embodiment may be made without departing from the novel and advantageous features of the present invention. Accordingly, all such modifications and variations are intended to be included within the scope of the appended claims.

What is claimed is:

1. A viscous coupling, comprising:
   relatively rotatable first, second and third rotating members forming an operation chamber in which a viscous fluid is to be confined;
   a dividing member placed inside the operation chamber for dividing the operation chamber into a first chamber formed by the dividing member and the first and third rotating members, and a second chamber formed by the dividing member and the second and third rotating members; and
   pump means for controlling flow of the viscous fluid between the first and second chambers, said pump means being activated by a relative rotation of the first and second rotating members.

2. The viscous coupling of claim 1, wherein the pump means is a vane pump.

3. The viscous coupling of claim 2, wherein the vane pump comprises:
   an outer housing connected to the first rotating member;
   a rotor relatively rotatable to the outer housing, to be inside an inner circumference of the outer housing, having an outer circumference smaller than the inner circumference of the outer housing such that there is an operation room between the outer circumference of the rotor and the inner circumference of the outer housing, and connected to the second rotating member;
   a vane attached on the rotor which maintains contact with the inner circumference of the outer housing while the outer housing and the rotor relatively rotates; and
   a pair of a first port connecting the operation room and the first chamber, and a second port connecting the operation room and the second chamber.

4. The viscous coupling of claim 3, wherein the first port acts as an exhaling port and the second port acts as an inhaling port when the second rotating member is rotating faster than the first rotating member such that the viscous fluid flows from the second chamber to the first chamber, whereas the second port acts as an exhaling port and the first port acts as an inhaling port when the first rotating member is rotating faster than the second rotating member such that the viscous fluid flows from the first chamber to the second chamber.

5. A viscous coupling, comprising:
   relatively rotatable first, second and third rotating members forming an operation chamber in which a viscous fluid is to be confined;
   a dividing member placed inside the operation chamber for dividing the operation chamber into a first chamber formed by the dividing member and the first and third rotating members, and a second chamber formed by the dividing member and the second and third rotating member; and
   a vane pump for controlling flow of the viscous fluid between the first and second chambers, said vane pump having an outer housing connected to the first rotating member;
   a rotor rotatable relative to and within the outer housing, having an outer circumference smaller than the inner circumference of the outer housing such that there is an annular space between the outer circumference of the rotor and the inner circumference of the outer housing, and connected to the second rotating member;
   a vane attached to the rotor which maintains contact with the inner circumference of the outer housing while the outer housing and the rotor rotates relative to each other; and
   a first port connecting the annular space and the first chamber, and a second port connecting the annular space and the second chamber, wherein the first port acts as an exhaling port and the second port acts as an inhaling port when the second rotating member is rotating faster than the first rotating member such that the viscous fluid flows from the second chamber to the first chamber, whereas the second port acts as an exhaling port and the first port acts as an inhaling port when the first rotating member is rotating faster than the second rotating member such that the viscous fluid flows from the first chamber to the second chamber.

* * * * *